Patented June 29, 1937

2,085,565

UNITED STATES PATENT OFFICE 2,085,565

METHOD OF REDUCTION OF SULPHUR

Charles W. Andrews, Chicago, Ill., assignor to H. A. Brassert & Company, Chicago, Ill., a corporation of Illinois No Drawing. Application December 15, 1936, Serial No. 115,952

5 Claims. (Cl. 75—55)

This invenion comprises a new and improved method and means for the reduction of sulphur, silicon and objectionable impurities in molten metal.

Many attempts have been made to use various compounds to reduce the amount of sulphur and impurities contained in molten metal, particularly iron and steel. The use of lime would seem the most logical on account of its known property of reducing sulphur in the blast furnace. However, its reaction is so slow when mixed with molten metal that it is not practicable within an allowable time. The more common method, which is in general use, is that of using sodium carbonate. Usually this material is used in the form of fused briquettes, which preferably are added to the ladle of molten metal. Various other mixtures have been proposed, as for example, sodium fluoride and calcium carbonate or calcium oxide, and also a mixture of a large proportion of sodium carbonate with small proportions of calcium oxide and manganese dioxide.

It is an object of my invention to reduce the sulphur in ferrous metal to below the percentage allowed in rolling steel, preferably sheet steels which are later deep drawn, as for instance, in the automobile industry.

It is another object to use for this purpose a material which will give off large quantities of carbon dioxide gas in order to better agitate the metal bath during the purifying process.

It is a further object to use a material which will provide desired fluidity in a sulphur removing mixture.

It is another object to provide a mixture containing material serving to reduce the destructive action of the soda ash on the lining of the ladle.

It is an additional object to use materials in the mixture which will reduce sodium sulphide, releasing the sodium for further reaction with the impurities in the metal and forming calcium sulphide in the slag.

It is also an object to provide a metal preferably having a content of approximately ½ to 1% of manganese in the molten iron to expedite the removal of the sulphur from the metal, the manganese acting as carrier of the sulphur to the slag.

Other and further objects will appear as the description proceeds.

I have found that a mixture of limestone, sodium carbonate and fluorspar is an excellent mixture to accomplish the purposes of this invention.

In the use of a mixture of sodium carbonate, limestone and fluorspar for desulphurization of pig iron, all three constituents have a definite function which can be explained as follows:

(1) The sodium carbonate reacts with sulphur to form sodium sulphide plus carbon dioxide. This reaction is known to take place more effectively when carbon, silicon or other reducing agent is present.

1. $Na_2CO_3$ plus S plus 2C equals $Na_2S$ plus 3CO

2. $Na_2CO_3$ plus S plus Si equals $Na_2S$ plus CO plus $SiO_2$.

The second reaction may be expected to take place to the greatest extent. Thus silicon as well as sulphur is removed from the iron (2) The fluorspar is effective in speeding up the reaction or in causing the reaction to go more nearly to completion by virtue of its well known fluxing action at high temperatures. In this case it fluxes both the silica and sodium sulphide which would normally form around the particles of soda ash and slow down or stop the reaction. In other words, the presence of fluorspar permits the sodium carbonate to be used more effectively and completely.

(3) I use limestone, preferably 1½" and smaller, instead of burnt lime because of the fact that when the stone, which I preferably place in the ladle before pouring in the iron, is exposed to high temperatures it gives off carbon dioxide gas and forms burnt lime. I have found that calcitic limestone and dolomitic limestone can both be used, although commercial operation shows that dolomitic limestone is more effective. The dissociation of the stone leaves the lime in a very receptive state to unite with sulphur. An additional advantage is the agitation of the metal by the carbon dioxide gas which is released. I prefer to use screenings having a maximum size of 1½" and preferably including small limestone which is screened out of the limestone used for blast furnace purposes, in order to save expense. I have found that the pieces of limestone of the 1½" size take up to as much as ten minutes to finally disappear in the bath and during the whole of this time the agitation of the bath is increased owing to the release of carbon dioxide gas from the stone. The carbon dioxide gas may to some extent unite with the silicon of the iron, thus forming silicon oxide and carbon monoxide gas, as experiments definitely show the formation of some carbon monoxide gas, either from sodium carbonate and/or limestone. The calcium oxide enters the reaction as a desulphurizing agent similar to the sodium carbonate, except that the reaction of lime alone is slower than the reaction of soda ash. In the presence of soda ash, lime probably takes up the sulphur from the sodium sulphide and releases the sodium for further desulphurizing action. That is, calcium oxide plus sodium sulphide gives calcium sulphide plus sodium oxide. Here again, the fluorspar acts as a flux in forming a fluid slag containing the resultant calcium sulphide, thus permitting the reaction to proceed more effectively. It is generally known that lime and soda also unite to form a lime-soda compound, which may also have an influence in the removal of the sulphur.

Thus the presence of fluorspar and lime with sodium carbonate causes the reaction to proceed more rapidly and more efficiently by virtue of the lime taking up sulphur and the fluorspar producing a fluid slag, thereby permitting the maximum advantage to be taken of the sodium carbonate in giving rapid and complete desulphurization action.

Sodium is very active as a sulphur removing agent, and my invention provides a simple and inexpensive way of bringing nascent sodium and/or sodium oxide in contact with the metal, whereby sulphur and occluded gases and other impurities are removed. The sulphur in turn is partly removed from the sodium by the calcium of the limestone, thus releasing the sodium for further sulphur removal. In effect it becomes a carrier beyond its normal saturation point. I have found that where air is allowed to come in contact with the sodium sulphide of the slag, sulphur dioxide is given off quite rapidly, thus reducing the amount of sulphur which the slag contains.

It has been found in some cases that the gas released from the limestone in the ladle or container causes an agitation which is too violent for safety and may result in undesired eruptions of the bath. Therefore in some cases it is found desirable to substitute burned lime for some portion of the limestone in the mixture, thus reducing the violence of the reaction without losing any of the benefits of the several materials in the mixture.

It is well known that soda attacks all linings, whether basic, neutral or acid, more than other desulphurizing agents, particularly when used in large quantities, as is necessary where sulphur is high in the iron. As a result, the maintenance of the ladle lining is a matter of considerable expense.

It has been found that by reducing the proportion of soda to lime or limestone the life of the container lining can be greatly prolonged. Commercial operation has shown the most suitable mixture for this purpose to be dolomite or lime approximately 50%, soda approximately 25% and fluorspar approximately 25%. It will be noted that I have referred to 50% of either dolomite or lime. This is because commercial operation has shown that the percentage of soda should not exceed 25% of the total, whether lime or limestone is used. The 25% fluorspar has been found to give desired fluidity to the slag.

I have found that a mixture of approximately one-half limestone, one-fourth sodium carbonate and one-fourth fluorspar forms a preferable mixture to accomplish purposes of this invention. My experiments have shown that while the above figures are desirable, yet good results can be obtained so far as sulphur removal is concerned using as much as 35% of the sodium carbonate and 15% fluorspar, or 35% fluorspar and 15% sodium carbonate. For example, I added 1.875 lbs. of limestone, .562 lb. of sodium carbonate and 1.312 lbs. of calcium fluoride to 250 lbs. of iron which was melted in an induction furnace. This iron contained .047% sulphur and .23% silicon. At the end of thirty minutes, the sulphur was reduced to .028 and the silicon to .18. The slag contained 2.88% sulphur.

Another experiment was made using 1.875 lbs. of limestone, 1.312 lbs. of sodium carbonate and .562 lb. of calcium fluoride. This was added to 250 lbs. of iron in the same induction furnace. In this case, the sulphur was reduced from .055 to .025 and the silicon from .28 to .23. The sulphur in the slag was 2.68%.

Another run which was made was as follows: 1.875 lbs. of limestone, .9375 lb. of sodium carbonate and .9375 lb. of calcium fluoride were used with 250 lbs. of iron in the same induction furnace. The sulphur in the iron was reduced from .046 to .023 and the silicon in the iron from 1.17 to 1.06. The sulphur in the slag amounted to 1.63%. It will be noted that the amount of sulphur removed was approximately 45% and the silicon 20%. The third example is substantially that previously referred to as being a desirable mixture for the protection of the lining of the container.

It will thus be seen that the proportions which are preferable for the purpose of protecting the lining of the ladle or container are also effective for the purpose of sulphur removal. Thus a preferable mixture will effectively accomplish both purposes.

It has been found by full scale operations that the most desirable point for manganese is between .50 and 1.00% in the molten iron. When this percentage obtains in the iron, the most favorable sulphur reduction takes place, both as to quantity of reduction and also cost of mixture. Should the manganese be lower, the sulphur reduction is not quite so satisfactory, and should it be higher, unnecessary expense is involved in obtaining a higher manganese bearing ore for the furnace. The manganese in the iron unites with the sulphur, forming manganese sulphide, which has a melting point of approximately 2950° F. Its solubility in liquid pig iron decreases markedly below this temperature and it becomes relatively insoluble at the metal freezing temperature. As the temperature of the molten iron is well below this melting temperature of manganese sulphide, it tends to separate from the metal as inclusions and if given time to rise, or if it is brought in contact with the proper slag, it is largely removed.

The melting point of iron sulphide is about 2180° F. Iron sulphide is soluble in molten iron and does not separate until the metal freezes. Therefore it is virtually impossible physically to remove the soluble iron sulphide from molten iron. Before rapid desulphurization takes place, the sulphur should be precipitated as an insoluble sulphide. Manganese fulfills this purpose and can therefore be looked upon as very essential for desulphurization.

Important factors governing the rate of desulphurization are the presence of these inclusions in the melt, the size of the particles of sulphide, the frequency of contact of the sulphide inclusions with the slag, and the dissolving power of the slag for sulphides.

By the use of limestone and soda I have in the slag two compounds which will normally reduce manganese sulphide to manganese and form calcium and sodium sulphides, as the manganese sulphide is a much less stable compound. I have found in an experiment that under the conditions I am outlining, only .7% of the original manganese was transferred to the slag, and this amount is so small that it cannot begin to account for the sulphur removed. I believe therefore that the manganese may act as a transfer agent and assists in the transfer of the sulphur to the slag, itself being released from the sulphur and again being free to absorb sulphur from the metal.

I prefer to conduct the operation under an oxidizing atmosphere for the purpose of facilitating the removal of the sulphur from the slag which is formed in order to prevent reactions which may lead to the re-entry of the sulphur into the metal.

By the use of soda, fluorspar and lime the inclusions of sulphide in the metal will be larger in size and will therefore tend to float more rapidly and completely to the surface. The particle of sodium sulphide is relatively small but when soda is used with limestone and fluorspar, these elements unite with the sodium sulphide particle, making it larger.

While calcium fluoride was used in some experiments, it was found that commercial fluorspar was satisfactory and they are to be understood to be equivalents in the present process. Where soda is mentioned herein it is intended to include the commercial caustics and carbonates.

Where reference is made to a ladle it will be understood that this will include any container used for holding or transferring molten metal.

While I have described certain preferred methods and means for carrying out my invention, it is capable of variation to meet different conditions and requirements and I contemplate such changes and modifications as come within the spirit and scope of the appended claims.

I claim:

1. A method of purifying molten iron of sulphur and other inclusions, which comprises adding a mixture of approximately one-half limestone, one-sixth to one-third soda and one-third to one-sixth fluorspar to the molten metal.

2. A method of purifying molten iron of sulphur and other inclusions, which comprises adding a mixture of approximately one-half limestone, one-fourth soda and one-fourth fluorspar to the molten metal.

3. A method of purifying molten iron containing manganese of sulphur and other inclusions, which comprises adding to the molten metal sodium and calcium containing slag forming compounds, the ratio of sodium compound to calcium compound being from one to two parts of sodium compound to three parts of calcium compound, utilizing the contained manganese to form manganese sulphide in the molten metal and releasing the manganese of the sulphide for further sulphur removal by interchange of the sulphur into sodium and calcium sulphides in the slag.

4. In a process of desulphurizing molten iron containing manganese, the method of the recovery of manganese otherwise lost in the slag which comprises adding sodium and calcium slag forming compounds the ratio of the compounds being from one to two parts of sodium compound to three parts of calcium compound and the mixture being in sufficient quantity to cause the transfer of sulphur of the manganese sulphide to the sodium and calcium compounds, thus permitting the return of the manganese to the molten metal, the amount of manganese remaining in the slag being a small fraction of the original manganese in the metal.

5. The method of protecting the refractory lining of a receiving vessel containing a bath of molten ferrous metal during the desulphurization of said metal with material including soda which comprises largely neutralizing by the addition of a calcium compound the destructive action on the lining, of the soda used in desulphurization, the desulphurizing and lining protecting materials comprising approximately one-half lime or limestone, one fourth soda and one fourth fluorspar.

CHARLES W. ANDREWS.